(12) United States Patent
Ferris et al.

(10) Patent No.: US 12,171,199 B2
(45) Date of Patent: Dec. 24, 2024

(54) ANIMAL FEED/WATER CONTAINER MOUNTING SYSTEM

(71) Applicant: Well Dressed Barn, LLC, Metamora, MI (US)

(72) Inventors: Paul E. Ferris, Lapeer, MI (US); Edward F. Wood, Metamora, MI (US); Kate S. Wood, Metamora, MI (US)

(73) Assignee: Well Dressed Barn, LLC, Metamora, MI (US)

( * ) Notice: Subject to any disclaimer, the term of this patent is extended or adjusted under 35 U.S.C. 154(b) by 0 days.

(21) Appl. No.: 17/665,878

(22) Filed: Feb. 7, 2022

(65) Prior Publication Data
US 2022/0248635 A1    Aug. 11, 2022

Related U.S. Application Data

(60) Provisional application No. 63/146,712, filed on Feb. 8, 2021.

(51) Int. Cl.
*A01K 5/01* (2006.01)
*A01K 7/00* (2006.01)

(52) U.S. Cl.
CPC ............... *A01K 5/01* (2013.01); *A01K 7/005* (2013.01)

(58) Field of Classification Search
CPC . A01K 1/10; A01K 5/01; A01K 7/005; A01K 9/00; A47J 47/16; A47J 47/18
USPC .......................... 119/61.57; 248/309.1–316.8
See application file for complete search history.

(56) References Cited

U.S. PATENT DOCUMENTS

| 3,578,205 | A  | * | 5/1971 | Ballester ................. | A47J 45/02 220/DIG. 13 |
| 4,245,807 | A  |   | 1/1981 | York |   |
| 4,452,415 | A  |   | 6/1984 | Arnold |   |
| 6,102,349 | A  |   | 8/2000 | Hall |   |
| 7,185,864 | B2 | * | 3/2007 | Adams ............... | A47G 25/0614 248/304 |
| 7,201,355 | B1 |   | 4/2007 | Zien et al. |   |
| 7,207,088 | B2 | * | 4/2007 | Adams ............... | A47G 25/0614 16/404 |

(Continued)

FOREIGN PATENT DOCUMENTS

| EP | 0306555 A1 | * | 3/1989 | ............... A01K 9/00 |
| FR | 3058613 A3 | * | 5/2018 | ............... A01K 7/00 |
| GB | 2037572 A  | * | 7/1980 | ............... A47J 47/16 |

*Primary Examiner* — Morgan T Jordan
*Assistant Examiner* — Danielle A Clerkley
(74) *Attorney, Agent, or Firm* — REISING ETHINGTON, P.C.

(57) ABSTRACT

An animal feed/water container mounting system is described that can be cost effective, safe for the animals, resistant to spillage, durable, and easy to manufacture/install. The container mounting system may be used to mount an animal feed/water container to a vertical member. The container subject to mounting may include a bail and a container lip. The vertical member may have a front surface. The mounting system may include a bail hanging unit for hanging the bail and may include a container mounting bracket. The container mounting bracket may include multiple mounting bracket retaining tabs interspersed along the length of the container mounting bracket. The tabs may be designed to support a container lip of the container at a plurality of locations along the length of the container mounting bracket.

7 Claims, 9 Drawing Sheets

(56) References Cited

U.S. PATENT DOCUMENTS

| | | |
|---|---|---|
| 10,660,306 B2 | 5/2020 | Ernst |
| 10,750,719 B2 * | 8/2020 | Crews ...................... A01K 5/01 |
| 2007/0209597 A1 * | 9/2007 | Brock ...................... A01K 5/01 |
| | | 119/51.01 |

* cited by examiner

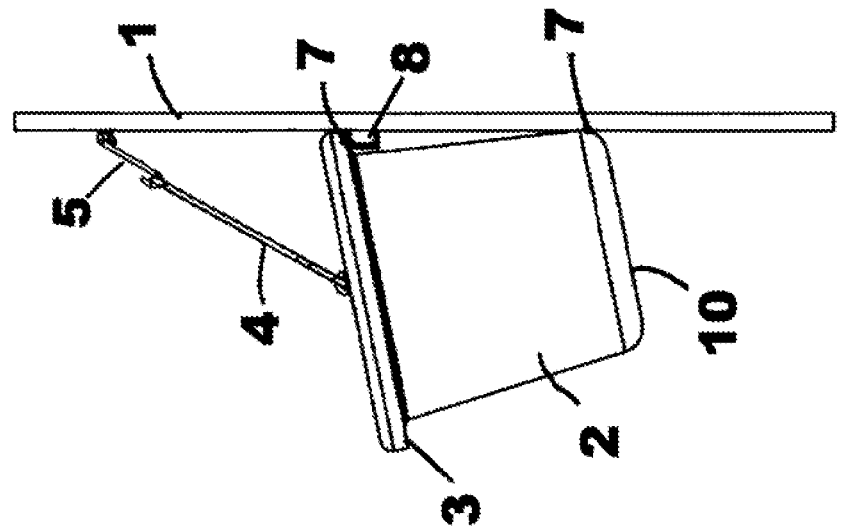
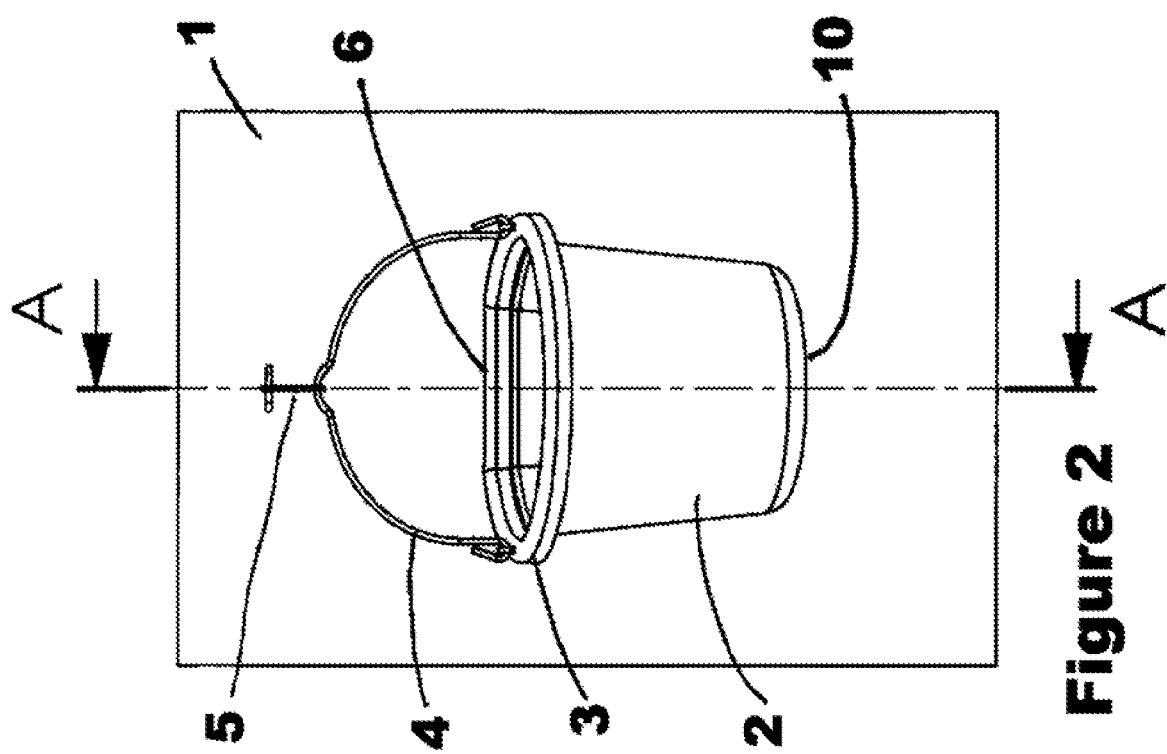

Detail D

Section A-A

Detail B

Detail C

ANIMAL FEED/WATER CONTAINER MOUNTING SYSTEM

CROSS-REFERENCE TO RELATED APPLICATION

This application claims the benefit of U.S. Provisional Patent Application No. 63/146,712, with a filing date of Feb. 8, 2021, the contents of which are hereby incorporated by reference in their entirety.

TECHNICAL FIELD

The present disclosure relates generally to the field of animal feeding and more particularly to the feeding of farm animals in stalls. Specifically, the disclosure relates to systems of mounting feed/water containers to the walls of animal pens/stalls.

BACKGROUND

There have been prior art mounting systems which attempt to provide for the mounting of containers for the use of agricultural and domestic uses in addition to industrial. Such a mounting system requires a simple, quick method which will securely hold a bucket against a wall in a continuously stable manner. The bucket needs to be secure while being bumped and brushed against by farm animals, and it should be mounted with minimal effort since the fully loaded bucket can have a considerable weight. There are a multitude of manufacturers providing containers for feeding and watering animals and, as such, there are a variety of bucket sizes and shapes. The prior art mounting systems generally have flaws such as requiring specific buckets and lacking flexibility for a variety of shapes and sizes.

In U.S. Pat. No. 4,245,807 ('807), the inventors thereof assert ease of engagement and disengagement of a bucket. The user merely slips the bucket rim between the vertical mounting support and a curved bracket, whereupon the user lowers the bucket until it rests on the ledge of the bucket bracket with the projecting rim of the bucket secured between the mounting support and the lower curved flange. This mounting system is not free of shortcomings. Although the system is easy to use, it can only use containers (buckets, pails, etc.) of a specific height. Furthermore, the system only provides a narrow width of support at the base of the containers. Also, the system provides only simple two-point contact. This allows for significant rotation and movement of the container, risking spillage/loss of feed.

Moreover, such mounting systems may put animals at risk because they reside within the living area of domestic animals. An accompanying bracket should not hang up on the animal's halters, bridles, and other animal harnesses. Some animals have been killed by having been caught on objects in their stalls and suffocating on such trapped harnesses. When no container is mounted in such mounting systems, the metal brackets thereof may pose such a risk to the animals.

U.S. Pat. No. 6,102,349 ('349) discloses a system for which the inventors assert that locking the container (pail) handle and securing the pail against a stable wall, the assembly prevents spillage of the contents of the pail when an animal feeds or drinks from it. While the system of the '349 patent may prevent the container from being knocked loose to the floor, it also has a vertical line of contact with the wall which allows the container to rotate freely around the vertical axis thereof, which, in turn, permits spillage as the bucket is bumped from the side.

U.S. Pat. No. 10,660,306 ('306) describes a mounting system for securing feed and watering containers which includes an integrated bail hook and a bucket lip. As with other prior art systems, the '306 system provides only two points of contact with the bucket which allows bouncing and rotation when an animal pushes against it. Also, there is a limited number of containers which this system will hold since many of the containers have gussets and other supportive members under the bucket lip. Further, there is a height restriction based on the bail to lip configuration of the containers, which can further exacerbate the bouncing and rotating of the containers.

The mounting system of U.S. Pat. No. 4,452,415 ('415) includes a bail holder and a lip to rest the bucket. However, because there is fixed height between the bail and the lip, the number of buckets that will fit this system is, again, limited. Also, as with other systems, the '415 system will readily allow the containers to rotate, thus risking content spillage.

Accordingly, while many prior art animal feed container mounting systems inventions have attempted to fill the needs of a system that is cost effective, safe for the animals, resistant to spillage, durable, and easy to manufacture/install, previous systems have fallen short.

SUMMARY

According to an embodiment, an animal feed/water container mounting system may be used to mount an animal feed/water container to a vertical member. The container may include a bail and a container lip. The vertical member may have a front surface.

The mounting system may include a bail hanging unit for hanging a bail of a container; and may also include a container mounting bracket. The container mounting bracket has a length, a thickness, and a height.

The container mounting bracket may include a plurality of mounting bracket retaining tabs interspersed along the length of the container mounting bracket. The tabs may be designed to support a container lip of the container at a plurality of locations along the length of the container mounting bracket.

The thickness of the container mounting bracket may have a front surface disposed away from the front surface of the vertical member and a rear surface disposed adjacent to and abutting the front surface of the vertical member. The plurality of mounting bracket retaining tabs may have a tab thickness that is less than the thickness of the container mounting bracket. The difference in thickness between the mounting bracket retaining tabs and the container mounting bracket may provide for a mounting bracket container lip clearance space between the mounting bracket retaining tabs and the front surface of the vertical member into which the container lip can fit while the mounting bracket retaining tabs stably hold the container.

The container may have a bottom and the bail hanging unit may be adjustable to allow the container to both: i) rest its lip on the container mounting bracket; and ii) simultaneously allow the bottom of the container to rest against the vertical member. The adjustability of the bail hanging unit may include a mechanism to change the length the bail hanging unit. Alternatively, the adjustability of the bail hanging unit may include a mechanism to change the contact/connection position between the bail hanging unit on the vertical member.

All of the edges/corners of the container mounting bracket and the plurality of mounting bracket retaining tabs may be rounded/tapered to inhibit the hang up of animal halters, bridles, or other animal harnesses thereon. Also, the plurality of mounting bracket retaining tabs may include a breakaway line to allow said mounting bracket retaining tabs to breakaway when excess pressure is exerted by the hang up of animal halters, bridles, or other animal harnesses thereon. The breakaway line on said plurality of mounting bracket retaining tabs may be created by one of scoring, groves, perforations, or pre-molded imperfections in the mounting bracket retaining tabs. The breakaway line may be preferably, per an embodiment, created by perforations in the mounting bracket retaining tabs.

The container mounting system may also include means for stably fastening the container mounting bracket to the vertical member. Stably fastening the container mounting bracket to the vertical member, per an embodiment, may include one or more of wires, adhesives, or other fasteners. The preferred means for stably fastening the container mounting bracket to the vertical member may include mounting bracket fastener screws which pass through bracket fastener holes in the container mounting bracket and into the vertical member.

The length of the mounting bracket, the mounting bracket container lip clearance space and the spaced dispersion of the plurality of mounting bracket retaining tabs along the mounting bracket length provide clearance for most container types. The container may be cylindrical or flat-backed. The flat-backed container may include one or more of a container selected from a round container with a flat back, a square container, a rectangular container, a triangular container, or other polygonal containers having a flat back.

The container mounting bracket may be formed from materials such as metals or sturdy polymers which are resistant to weather and animal fluids. Specifically, the sturdy polymer may be chosen from one or more of polyethylene, rubber-polyethylene blends, or nylons, among other example materials.

According to an embodiment, an animal feed/water container mounting bracket may include a main body, one or more fasteners, a pair or more of mounting bracket retaining tabs, a mounting bracket container lip clearance, and a breakaway fracture line. The main body establishes an elongated length. The main body has a front end and a rear end. The fastener hole(s) reside in the main body. The pair of mounting bracket retaining tab(s) extend vertically from the main body. The mounting bracket container lip clearance is established between each of the pair of mounting bracket retaining tab(s) and the rear end of the main body. The breakaway fracture line resides at a base of each of the pair of mounting bracket retaining tab(s).

BRIEF DESCRIPTION OF THE DRAWINGS

FIG. 2 depicts a front view of the container mounting system in use;

FIG. 3 depicts a side view of the container mounting system in use;

DETAILED DESCRIPTION

Figure 1:
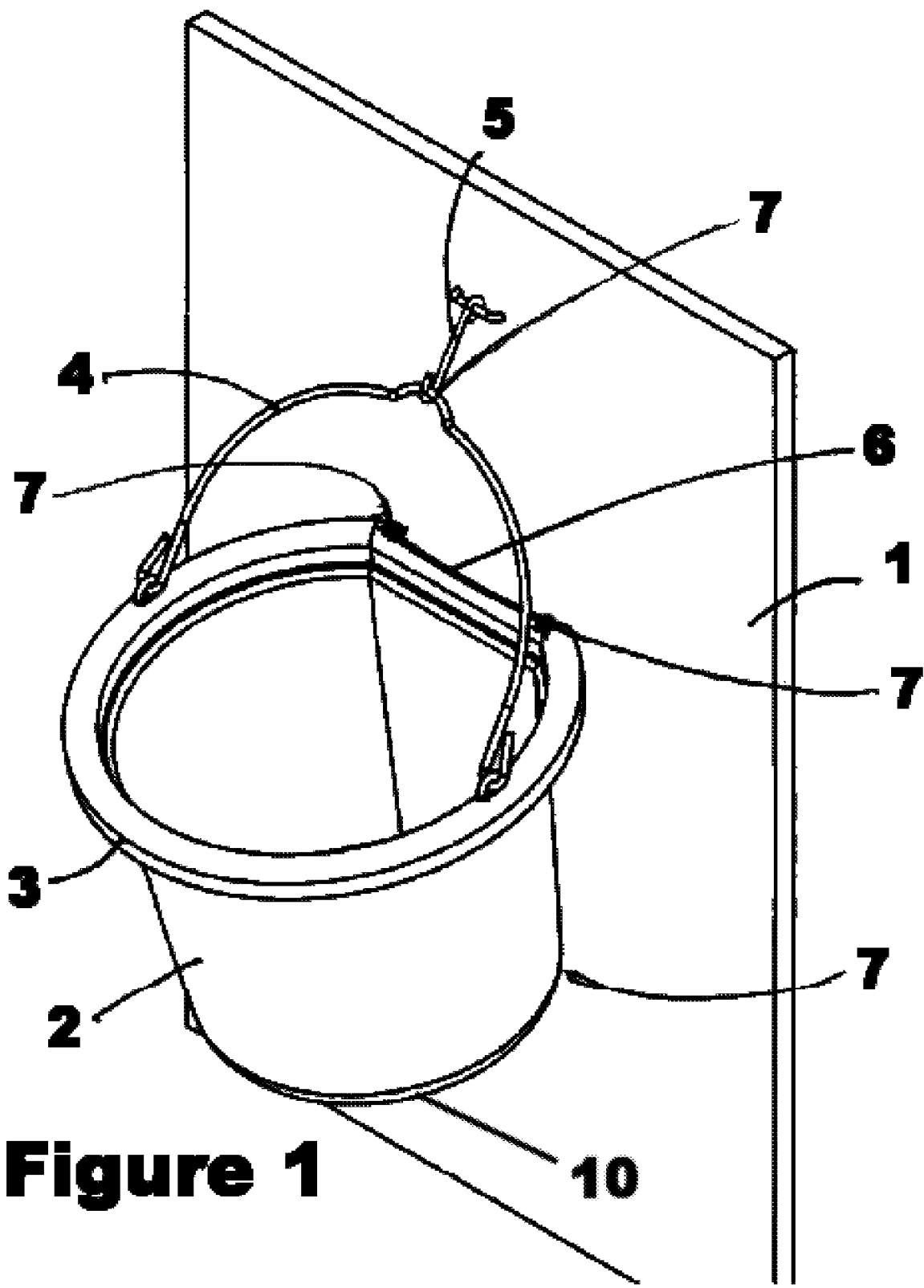
FIG. 1 depicts an orthogonal view of an embodiment of a container mounting system shown in an example use.
Figure 5:
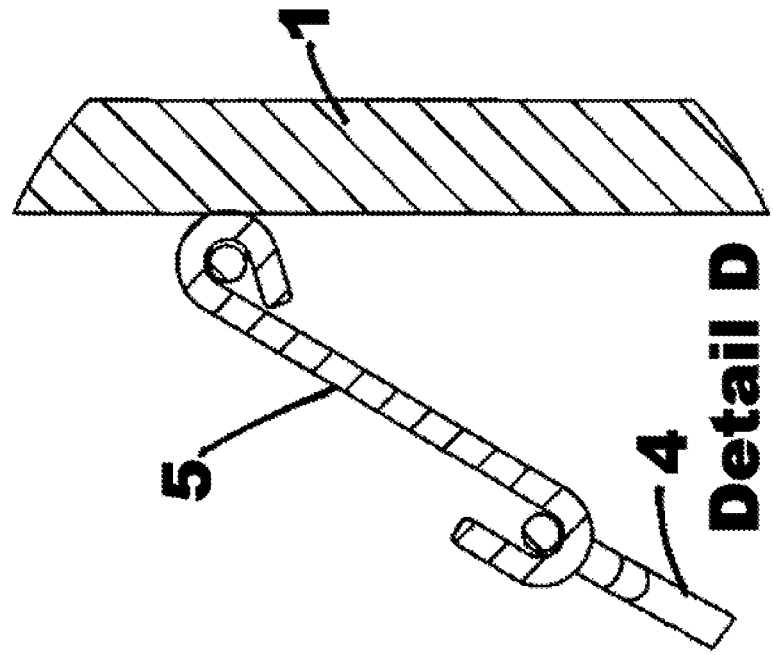
FIG. 5 depicts the enlarged Detail D of FIG. 4.

The present disclosure is an animal feed/water container mounting system that, per certain embodiments, may have one or more of the following attributes: cost effectiveness, safe for the animals, resistant to spillage, durable, adaptable and suitable for use with most available containers currently in use, and easy to manufacture/install. Throughout the present specification and with respect to the FIGS. 1-11, the following Table 1 is a list of reference numerals 1-14 and their identifying components.

TABLE 1

| Ref # | Identifier |
| --- | --- |
| 1 | Vertical member - e.g. pen/stall wall |
| 2 | Container (bucket, pail, etc.) |
| 3 | Container lip |
| 4 | Bail (handle of container) |
| 5 | Bail hanging unit |
| 6 | Back of container |
| 7 | Stabilizing contact points and locations |
| 8 | Bucket keeper mounting bracket |
| 9 | Bracket fastener |
| 10 | Container bottom |
| 11 | Bracket fastener holes |
| 12 | Breakaway fracture line |
| 13 | Edge tapering |
| 14 | Mounting bracket container lip clearance |
| 15 | Mounting bracket retaining tabs |
| 16 | Mounting bracket length |
| 17 | Mounting bracket height |
| 18 | Mounting bracket thickness |
| 19 | Main body |
| 20 | Front end |
| 21 | Rear end |

FIG. 1 depicts an orthogonal view of the animal feed/water container mounting system (hereafter "mounting system") presented in use. The mounting system mounts a container 2 to a vertical structure 1 (such as a pen or stall wall). The mounting system generally includes a bail hanging unit 5 from which the bail 4 of the container 2 is hung. The bail hanging unit 5 being long enough to allow the container 2 to touch the vertical structure 1 in multiple stabilizing locations 7. The mounting system also includes a container lip mounting bracket 8, also known as a bucket keeper mounting bracket. In FIG. 1, the container mounting bracket 8 is not visible because the container lip 3 at the rear of the container 2 rests thereon.

When used in conjunction with containers 2 having a flat back 6 (i.e., round containers with a flat back or other shaped containers with flat backs such as square, rectangular, triangular, polygonal, etc.), the mounting system provides the containers 2 with at least five stabilizing locations 7. The first of the stabilizing locations 7 is at the interconnection between the container's bail 4 and the bail hanging unit 5. The second and third stabilizing locations 7 are the interconnection between the flat back 6 of the container lip 3 and the container lip mounting bracket 8. The fourth and fifth stabilizing locations 7 are the points of contact between the flat back 6 of the bottom 10 of the container 2. With round containers that do not have a flat back 6, the mounting system includes at least four stabilizing locations 7. That is, the mounting system still has the same first three stabilizing locations 7, but only include a single stabilizing location 7 at the bottom 10 of the container 2. It should be noted that the number of stabilization points 7 may be larger than the four or five disclosed above, depending on the configuration of container lip mounting bracket 8.

FIG. 2 depicts a front view of the mounting system in use. FIG. 2 shows how the container 2 is mounted to the vertical structure 1. The container bail 4 is attached to the bail hanging unit 5. The container lip 3 is attached at the back 6 to the container mounting bracket 8 (again, hidden by the container 2). Section A-A of FIG. 2 is shown in FIG. 4.

FIG. 3 depicts a side view of the mounting system in use. The container mounting bracket 8 is visible in this view. The container lip 3 rests on, and is restrained by, the container mounting bracket 8. The interaction between the container lip 3 and the container mounting bracket 8 forms two or more stabilizing locations 7.

Figure 4:
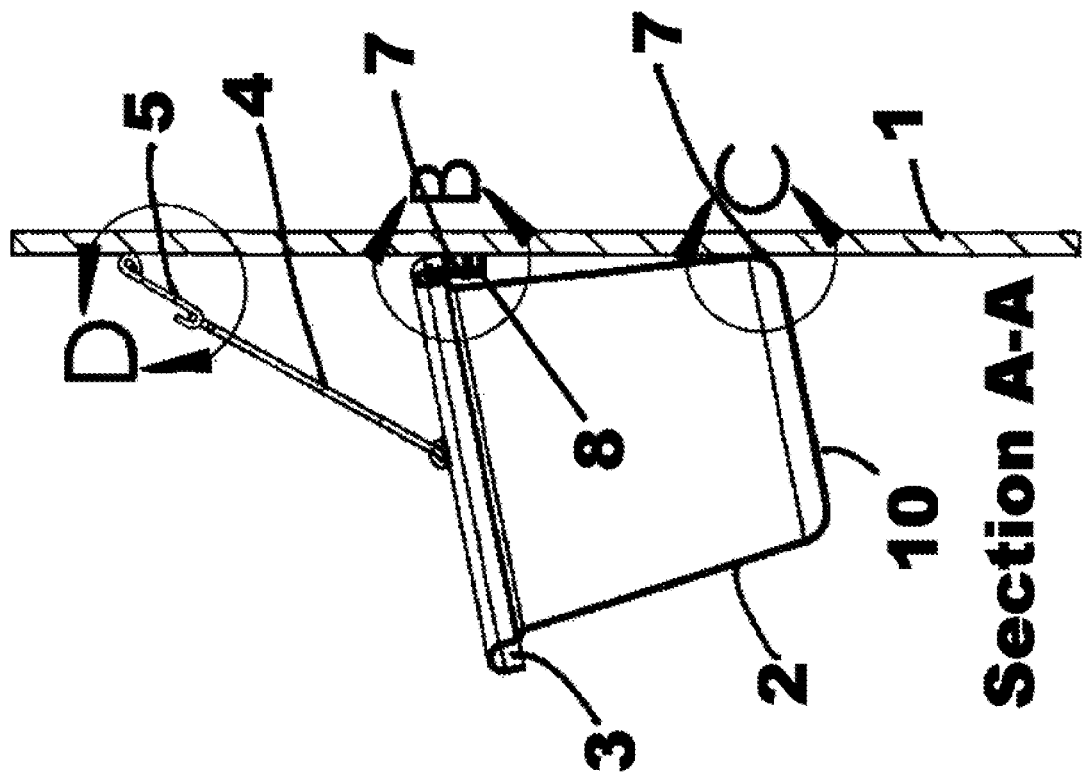
FIG. 4 depicts the cross-section A-A of FIG. 2.

FIG. 4 depicts the cross-section A-A of FIG. 2. The figure indicates three details of interest in the mounting system. Detail D is presented in FIG. 5 and demonstrates that the bail hanging unit 5 is attached to the vertical member 1 and to the container bail 4. The bail hanging unit 5 is designed to allow the container bottom 10 to contact the vertical member 1. In this regard, the bail hanging unit 5 may be adjustable to allow the container 2 to both: I) rest its lip 3 on the container mounting bracket 8; and ii) simultaneously allow the container bottom 10 to rest against the vertical member 1. This adjustability may include a mechanism to change the length the bail hanging unit 5 or a mechanism to change the contact/connection position of the bail hanging unit 5 on the vertical member.

Figure 6:
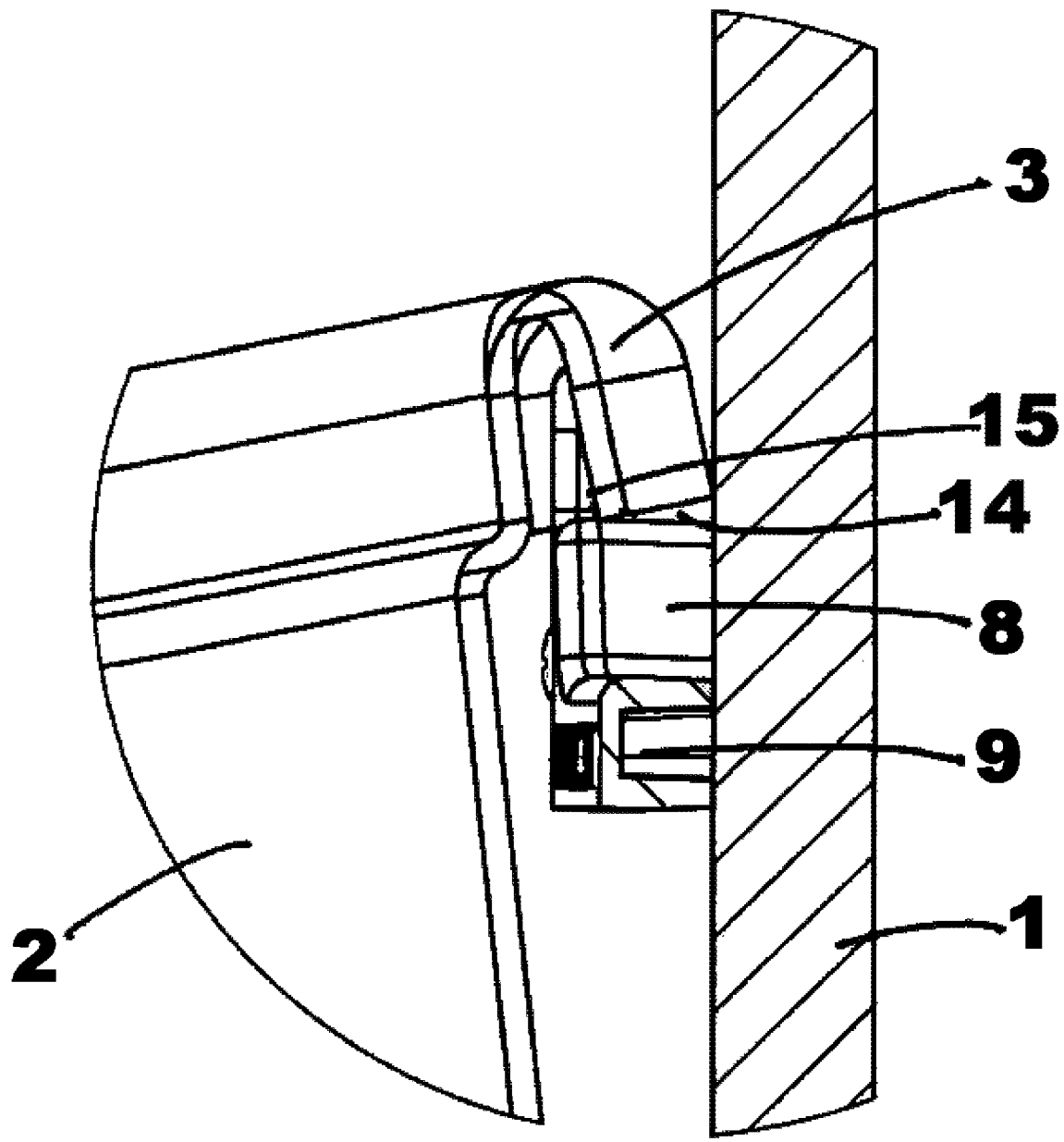
FIG. 6 depicts the enlarged Detail B of FIG. 4.

FIG. 6 depicts Detail B of FIG. 4. Specifically, FIG. 6 shows how the container 2 rests on/engages the container mounting bracket 8. The container lip 3 engages with at least a portion of the container mounting bracket 8. Specifically, the container mounting bracket 8 includes a plurality of mounting bracket retaining tabs 15. The retaining tabs 15 are spaced away from the vertical member 1 such that the space therebetween provides a container lip clearance 14 space. The clearance distance is relatively large to allow for different sizes and shapes of containers 2. This also accommodates containers 2 of differing container lip 3 configurations. FIG. 6 demonstrates how the container mounting bracket 8 is attached to the vertical member 1 with fasteners 9. The fasteners 9 may be any known means to achieve the fastening and can be, for example, screws or bolts. The fastening may also be accomplished by adhesive or wires or some other technique.

Figure 7:
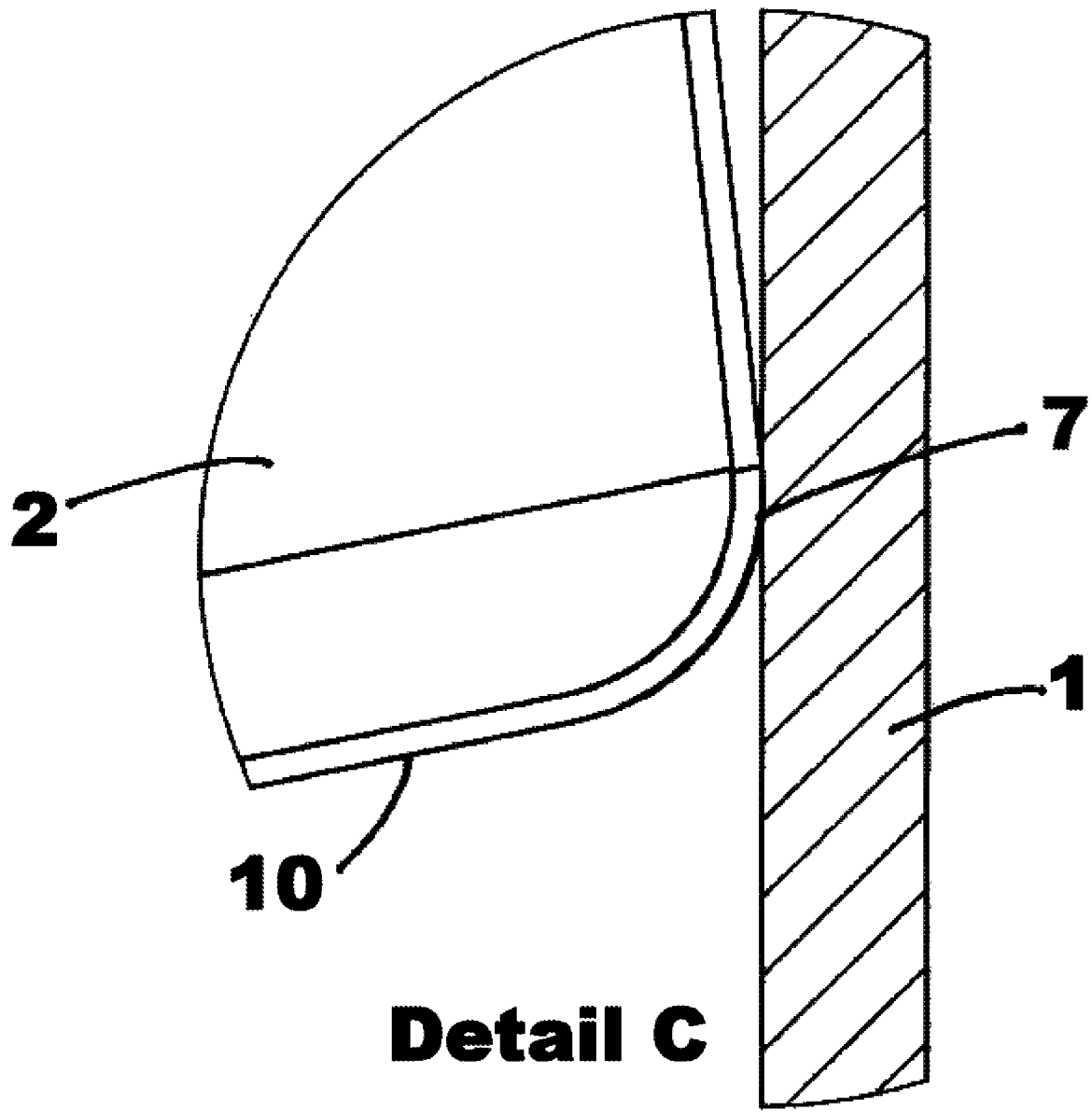
FIG. 7 depicts the enlarged Detail C of FIG. 4.

FIG. 7 depicts Detail C of FIG. 4. Specifically, FIG. 7 demonstrates how the bottom 10 of the container 2 rests on the vertical member 1. The surface to surface contact points between the container bottom 10 and the vertical member 1 form stabilization points 7.

Figure 8:
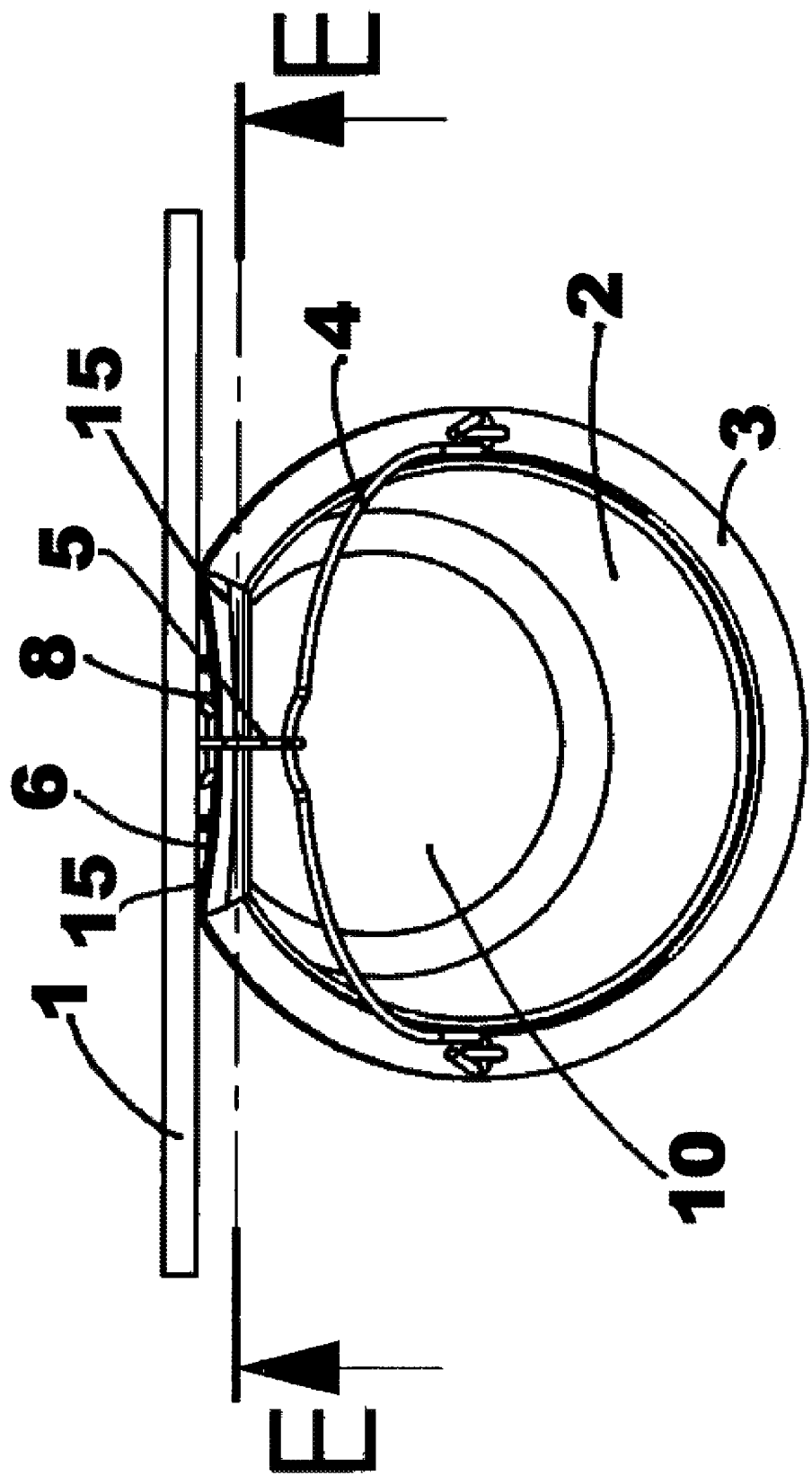
FIG. 8 depicts a top view of the container mounting system in use.

FIG. 8 depicts a top view of the container mounting system in use. In this top view, it is easier to see how the container lip 3 at the back of the container 6 engages with the mounting bracket retaining tabs 15 of the container mounting bracket 8. Cross section E-E of FIG. 8 is shown in FIG. 9.

Figure 9:
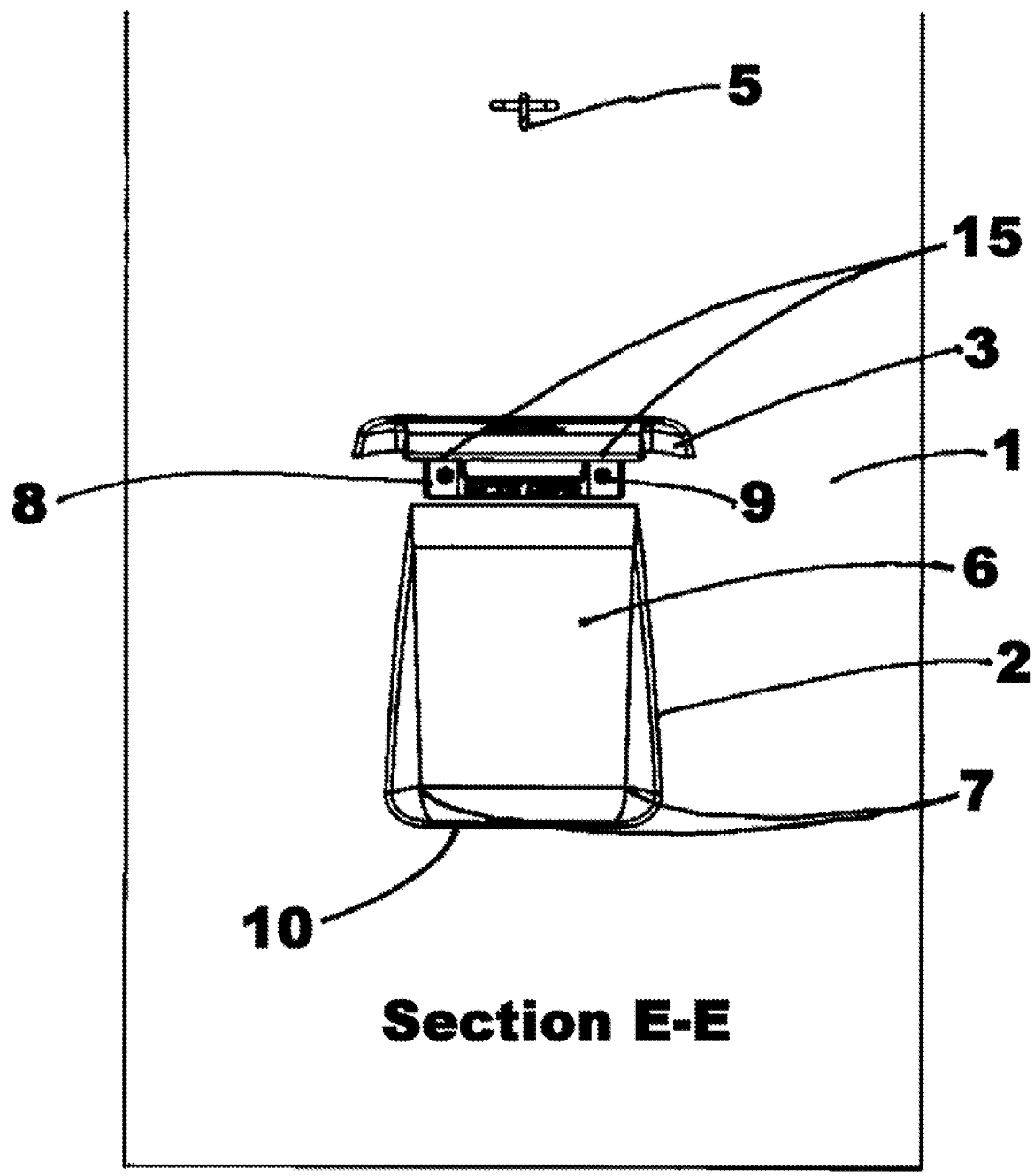
FIG. 9 depicts cross section E-E of FIG. 8.

FIG. 9 depicts cross section E-E of FIG. 8. Specifically shown is how the bail hanging unit 5 is attached to the vertical member 1. Also shown is a depiction of the container mounting bracket 8 and how it is attached to the vertical member 1 using the bracket fasteners 9. Two fasteners 9 are shown, however, more or fewer fasteners 9 may be employed as needed. FIG. 9 also more readily depicts how the container lip 3 is held by the mounting bracket retaining tabs 15 on the container mounting bracket 8. Finally, FIG. 9 indicates how the container bottom 10 at the back of the container 6 rests against the vertical member 1 and creates stabilization points 7.

Figure 10:
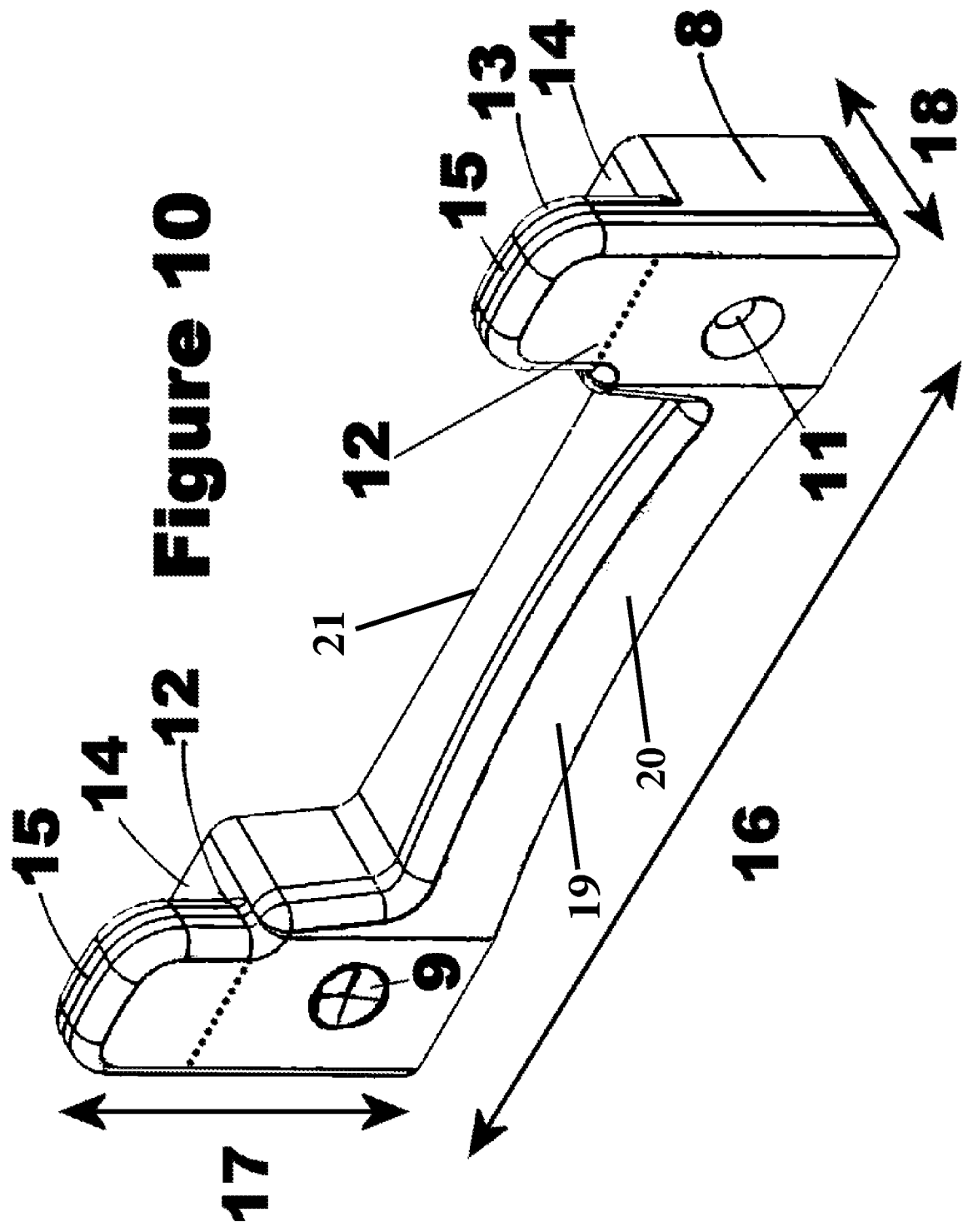
FIG. 10 depicts an orthogonal view of an embodiment of a mounting bracket that can be used with the container mounting system.

FIG. 10 depicts a perspective view of the container mounting bracket 8 of the mounting system according to this embodiment. In this embodiment, the container mounting bracket 8 includes a plurality of mounting bracket retaining tabs 15. The tabs 15 extend vertically from a main body 19 of the container mounting bracket 8. The main body 19 has a front end 20 and a rear end 21. These tabs 15 are designed to be break-away tabs to protect the animals from being caught thereon and, as such, the tabs 15 have a breakaway fracture line 12 (represented by dotted lines in FIG. 10). The breakaway fracture line 12 can extend and span transversely wholly through each of the tabs 15 in order to effect a proper facture and dislocation thereacross upon exertion of a threshold force, or can extend and span through portions of the tabs 15 that constitute less than the whole. The breakaway fracture line 12 resides at a base of each of the tabs 15 where the tabs initially begin their extent vertically from the main body 19. This breakaway fracture line 12 can be formed by perforation of the tab material, but any known method to create such an effect is suitable. For example, the breakaway line 12 can be created by techniques such as break-away feature scoring, grooves, perforations, or pre-molded imperfections. Further, by providing the tabs 15 with edge tapering 13 the rounded edges allow halters/bridles to more easily slip off if they happen to get temporarily caught. Further, the container mounting bracket 8 is fastened tightly onto the vertical member 1, thereby preventing the animal from getting close enough to catch on the tabs 15.

It should be noted that, while the container mounting bracket 8 is fastened tightly onto the vertical member 1, the tabs 15 thereof are spaced laterally away from the interface between the bracket 8 and the vertical member 1 and distanced therefrom. The space between the tabs 15 and the vertical member 1 defines a mounting bracket container lip clearance 14. This clearance 14 allows space for various container lip 3 configurations and for various sizes of containers 2.

While this embodiment includes two mounting bracket retaining tabs 15, the bracket may include more than two tabs, as needed to hold larger or differently shaped containers 2. Further, the longitudinal distance between tabs 15 along the length of the container mounting bracket 8 is designed to provide added stabilization of container 2.

FIG. 10 also indicates that the container mounting bracket 8 may possess bracket fastener holes 11 through which bracket fasteners 9 may be inserted and tightened-down in. The fasteners 9 attach the container mounting bracket 8 to the vertical member 1. FIG. 10 also shows certain dimensions of the container mounting bracket 8. The container mounting bracket 8 has a longitudinal length 16, a height 17, and a lateral thickness 18. As can be seen, the mounting bracket retaining tabs 15 have a lateral thickness that is less than the overall thickness 18 of the container mounting bracket 8. The height 17 defines a vertical direction in this orientation, and the longitudinal length 16 defines a horizontal direction in this orientation. The lateral thickness 18 defines a depth direction in this orientation.

Figure 11:
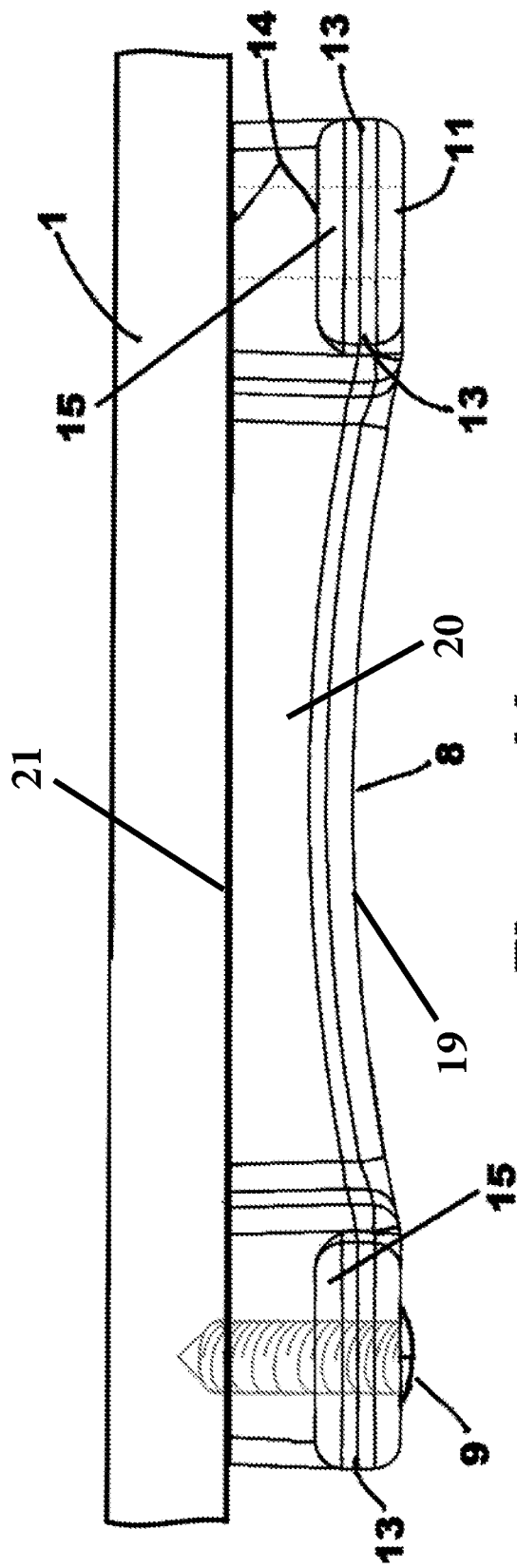
FIG. 11 depicts a top view of the mounting bracket attached to a vertical member.

FIG. 11 depicts a top view of the container mounting bracket 8 of the mounting system employed in use and attached to the vertical member 1. In this figure it can be seen how the difference in lateral thickness between the mounting bracket retaining tabs 15 and that of the overall lateral thickness 18 of the container mounting bracket 8 creates the mounting bracket container lip clearance 14 in the lateral direction between the vertical member 1 and the mounting bracket retaining tabs 15. Further, the container mounting bracket 8 may have bracket fastener holes 11 through which bracket fasteners 9 may extend into the vertical member 1.

Lastly, the environment of barns, stables and pens include both humidity and animal fluids. This environment tends to corrode many materials quite readily. Therefore, it may be desirable to form the container mounting bracket 8 from one or more materials that can endure such an environment. Suitable materials may include metals and sturdy polymers which are weather and bio-resistant. For example, polyethylene, rubber-polyethylene blends, and nylons may be used to form the container mounting bracket 8. Any other structural polymer could be used if it is sturdy, and resistant to corrosion by weather and animal bodily fluids.

It is to be understood that the foregoing description is not a definition of the invention, but is a description of one or more preferred exemplary embodiments of the invention. The invention is not limited to the particular embodiment(s) disclosed herein, but is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A container mounting system for mounting an animal feed/water container to a vertical member, the container mounting system comprising:
    a bail hanging unit; and
    a container mounting bracket having a first mounting bracket retaining tab and a second mounting bracket retaining tab, said first and second mounting bracket retaining tabs being spaced and dispersed horizontally from each other over a length of said container mounting bracket;
    wherein said first mounting bracket retaining tab has a first horizontal width extending along the length of said container mounting bracket and said second mounting bracket retaining tab has a second horizontal width extending along the length of said container mounting bracket;
    wherein a horizontal distance between said first mounting bracket retaining tab and said second mounting bracket retaining tab is greater than a sum of said first horizontal width of said first mounting bracket retaining tab and said second horizontal width of said second mounting bracket retaining tab;
    wherein, upon mounting of the animal feed/water container with the container mounting system, a first stabilizing location is established between a bail of the animal feed/water container and said bail hanging unit, a second stabilizing location is established between a container lip of the animal feed/water container and said first mounting bracket retaining tab, a third stabilizing location is established between the container lip of the animal feed/water container and said second mounting bracket retaining tab, and a fourth stabilizing location is established between a first location of a bottom of the animal feed/water container and the vertical member;
    wherein said fourth stabilizing location is established via a surface-to-surface contact point between the bottom of the animal feed/water container and the vertical member upon mounting of the animal feed/water container with the container mounting system;
    wherein said bail hanging unit has an elongated longitudinal extent in order to distance said first stabilizing location horizontally from the vertical member to allow the bottom of the animal feed/water container to rest against the vertical member and establish said fourth stabilizing location between the bottom of the animal feed/water container and the vertical member; and
    wherein said first mounting bracket retaining tab has a first terminal end and said second mounting bracket retaining tab has a second terminal end, said second stabilizing location being established via an interconnection contact point between the container lip of the animal feed/water container and said first terminal end of said first mounting bracket retaining tab, and said third stabilizing location being established via an interconnection contact point between the container lip of the animal feed/water container and said second terminal end of said second mounting bracket retaining tab.

2. The container mounting system of claim 1, further comprising a fifth stabilizing location established between a second location of the bottom of the animal feed/water container and the vertical member upon mounting of the animal feed/water container with the container mounting system.

3. The container mounting system of claim 1, wherein said second and third stabilizing locations are established via interconnection contact points between the container lip of the animal feed/water container and said first and second mounting bracket retaining tabs upon mounting of the animal feed/water container with the container mounting system.

4. The container mounting system of claim 1, wherein, upon mounting of the animal feed/water container with the container mounting system, a surface-to-surface contact is established between the container lip and the vertical member via establishment of said second and third stabilizing locations between the container lip and said first and second mounting bracket retaining tabs.

5. The container mounting system of claim 1, wherein said first and second mounting bracket retaining tabs include breakaway fracture lines to allow said first and second mounting bracket retaining tabs to breakaway when excess force is exerted thereagainst.

6. The container mounting system of claim 5, wherein said breakaway fracture lines are provided via at least one of scoring, grooves, perforations, or pre-molded imperfections in said first and second mounting bracket retaining tabs.

7. The container mounting system of claim 1, wherein said first mounting bracket retaining tab is spaced away from said vertical member to create a first space, said second mounting bracket retaining tab is spaced away from said vertical member to create a second space, and said first space and said second space establish a container lip clearance to accommodate said container lip of said animal feed/water container.

* * * * *